United States Patent [19]

Yamanoue et al.

[11] Patent Number: 4,931,727
[45] Date of Patent: Jun. 5, 1990

[54] MOVING BODY SPEED DETECTING DEVICE WHICH PRODUCES AND DETECTS A MAGNETIC POLE ON THE BODY SURFACE

[75] Inventors: Kouichi Yamanoue; Shigeyuki Akita; Hiroaki Tanaka, all of Okazaki; Tatsuo Sugitani, Mishima; Hideo Inoue, Kanagawa, all, Japan

[73] Assignees: Nippon Soken, Inc., Nishio; Toyota Jidosha Kabushiki Kaisha, Toyota, both of Japan

[21] Appl. No.: 259,326

[22] Filed: Oct. 18, 1988

[30] Foreign Application Priority Data

Oct. 28, 1987 [JP] Japan .................. 62-272787

[51] Int. Cl.$^5$ .............. G01P 3/42; B60T 8/32
[52] U.S. Cl. .................. 324/172; 188/181 R; 324/174
[58] Field of Search .................. 324/172–174, 324/206–208; 188/181 R; 340/670–672; 361/236, 239

[56] References Cited

U.S. PATENT DOCUMENTS

| 2,786,978 | 3/1957 | Warner | 324/172 |
| 2,794,951 | 6/1957 | Broding et al. | 324/206 |
| 3,243,692 | 3/1966 | Heissmeier et al. | 324/174 X |
| 3,312,861 | 4/1967 | Mauch | 324/172 X |
| 3,350,511 | 10/1967 | Johnson | 324/172 X |
| 3,873,912 | 3/1975 | Mori et al. | 324/206 |
| 4,164,706 | 8/1979 | Akita et al. | 324/208 |
| 4,396,405 | 1/1983 | Sato et al. | 324/174 |
| 4,405,896 | 9/1983 | Akita et al. | 324/208 |
| 4,418,288 | 11/1983 | Imai et al. | 307/117 |
| 4,677,378 | 1/1987 | Tokura et al. | 324/208 |

FOREIGN PATENT DOCUMENTS

| 59-31406 | 2/1985 | Japan . |
| 60-142266 | 7/1985 | Japan . |
| 60-125575 | 8/1985 | Japan . |
| 61-167815 | 7/1986 | Japan . |

Primary Examiner—Gerard R. Strecker
Attorney, Agent, or Firm—Cushman, Darby & Cushman

[57] ABSTRACT

According to this invention, a device for detecting the speed of transference of a moving body, having a construction such that the device comprises a magnetizing element for forming a magnetic pole on a surface of a moving body made of a magnetic material and disposed in the vicinity of the moving body, a magnetic field detecting circuit provided adjacent to the moving body, for linking therewith the magnetic field of the magnetic pole formed by the magnetizing element and for outputting an electrical voltage in accordance with a variation of the magnetic field caused by the transference of the moving body, and an output signal processing circuit for processing a signal output by the magnetic field detecting circuit and for determining the speed of transference of the moving body can be obtained, and by utilizing the device mentioned above, an effect whereby a signal corresponding to the displacement speed of a moving body is continuously obtained and therefore, a moving body need not be precisely fabricated with a specific configuration such as forming concave and convex portions on the surface of the moving body, and moreover, to continuously obtain precise information about the speed of the moving body, because even when the moving body moves at an extremely low speed, an increment of a ripple and a phase shift can not occur, can be realized.

13 Claims, 8 Drawing Sheets

MOVING BODY SPEED DETECTING DEVICE WHICH PRODUCES AND DETECTS A MAGNETIC POLE ON THE BODY SURFACE

BACKGROUND OF THE INVENTION

1. Field of the Invention

This invention relates to a device for detecting the speed of transference of a moving body which is transferred or displaced linearly or in a rotational direction, which device can be effectively utilized, for example, as a rotational angle detecting sensor for detecting the rotational speed of a wheel or the like of a vehicle.

2. Description of the Related Art

Several devices for detecting a rotational speed of a moving body such as a wheel of an automobile are known; for example, a rotary encoder utilizing a magnet pick up system whereby the rotational speed is detected by providing a plurality of projected portions on an outer surface of a rotor made of a magnetic metal and a pair of a permanent magnet and a coil arranged to face the projected portions (Japanese Unexamined Patent Publication No. 59-31406), or such an encoder utilizing an optical system in which the rotational speed is detected by providing a plurality of slits thereon, instead of the above projected portions, and detecting and counting the permeation of light therethrough (Japanese Unexamined Patent Publication No. 61-167815).

However, in these known systems, a special shape such as a concave-convex configuration, or slits, must be formed on or in the outer surface of the rotor, and these known systems have a further drawback in that it is impossible to accurately calculate the rotational speed of a rotor because an angle of turn of the rotor during a predetermined time interval can not be determined when the rotor rotates at an extremely low rotational speed, since the angle of turn can not be determined from the positions defined by a space formed between adjacent projected or concaved portions or slits, and therefore, an increased ripple and a phase delay occur.

SUMMARY OF THE INVENTION

The object of the invention is to overcome the above drawbacks and to provide a device for detecting the speed of transference of a moving body by which the most accurate information can be obtained without the necessity to form a portion of the moving body into a special configuration, and even in a condition such that the amount of transference thereof per unit time is extremely small.

To realize the object of this invention, a device for detecting the speed of transference of a moving body, according to the present invention, comprises a magnetizing means for forming a magnetic pole on a surface of a moving body made of a magnetic material, and disposed in the vicinity of the moving body, a magnetic field detecting means provided adjacent to the moving body, for detecting the variation of the magnetic field of the magnetic pole formed by the magnetizing means by passing the magnetic field therethrough and outputting an electrical voltage in accordance with a variation in the magnetic field caused by the transference of the moving body, and an output signal processing means for processing the signal output by the magnetic field detecting means to determine the speed of displacement of the moving body.

The magnetizing means used in this invention may comprise at least one core portion made of magnetic material, and an electromagnetic coil wound around the core portion. The magnetizing means may be further provided with a demagnetizing means, for forcibly eliminating the magnetic pole formed on the surface of the moving body, at one end of the magnetizing means along a direction of movement of a moving body such as a rotor, wheel or the like, and a sheet or plate-like material, for example, rolled steel or a metal foil.

The magnetic field detecting means according to this invention comprises at least a Hall element for providing a high density linking of the magnetic field of the magnetic pole formed by the magnetizing means with the Hall element, and further, the magnetic field detecting means used in this invention may consist of a Hall element and a detecting magnetic path portion made of a magnetic material, wherein the Hall element is placed close to the center of the detecting magnetic path portion and, for example, is nipped on the opposite sides thereof by two detecting magnetic path portions having the same configuration.

Further, the output signal processing means according to this invention may comprise, detecting a time at which the magnetic pole is formed by the magnetizing means and determining the speed of displacement of the moving body by calculating the time elapsed between the time at which the magnetic pole is formed and a time when the electric voltage generated by the magnetic field detecting means reaches a predetermined value.

Further, the output signal processing means according to this invention may comprise determining the transference speed of the moving body by comparing the data output by the magnetic field detecting means at the time at which the magnetic pole is formed by the magnetizing means with the current data output by the magnetic field detecting means.

As described above, the moving body of this invention includes a rotating body such as a rotor, wheel or the like, and a flat or plate-like body moving along the longitudinal axis thereof, such as rolled steel, a steel belt or a metal foil.

DESCRIPTION OF THE PREFERRED EMBODIMENTS

The preferred embodiments of the present invention will be now described with reference to the accompanying drawings.

Figure 1:
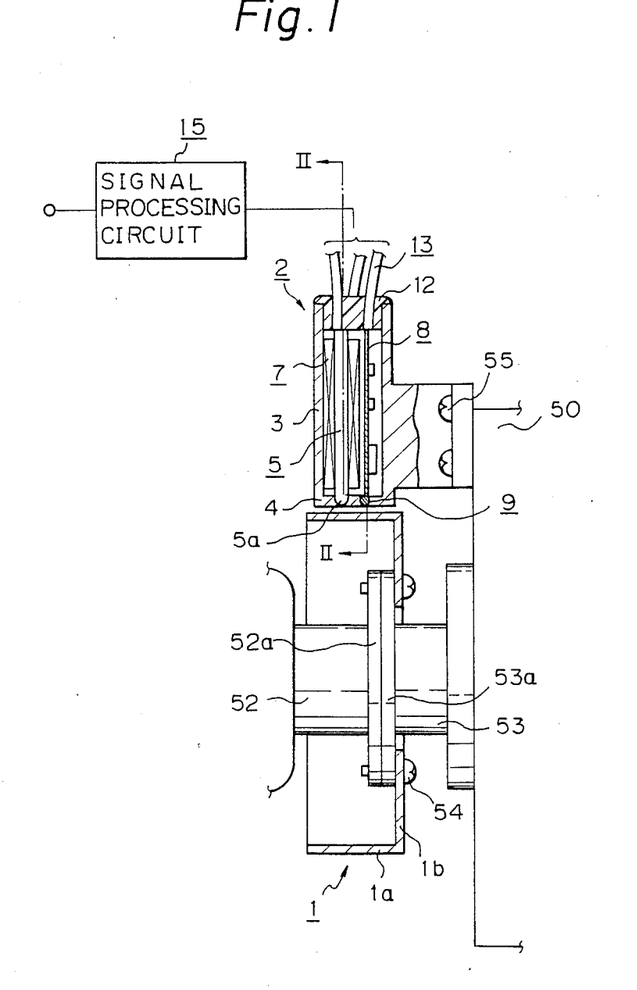
FIG. 1 is a cross sectional view of the device for detecting the speed of transference of a moving body of a first embodiment of the present invention.

FIG. 1 is a cross sectional view of the device for detecting a speed of transference of a moving body of a first embodiment, used as a rotational angle detecting sensor according to the present invention, to detect a speed of a wheel of an automobile.

Figure 2:
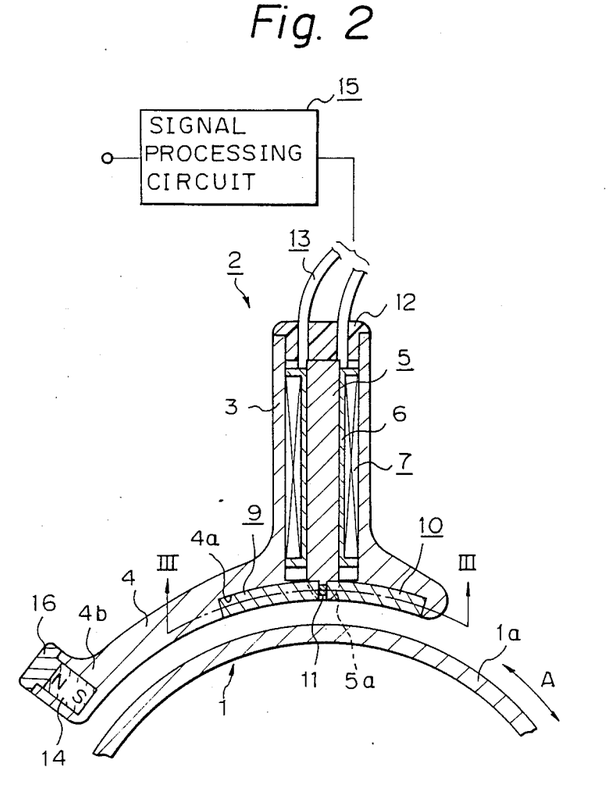
FIG. 2 is a cross sectional view of the detecting device taken along the line II—II in FIG. 1.
Figure 3:
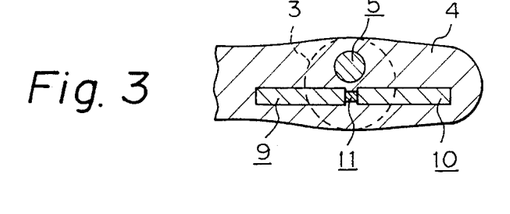
FIG. 3 is a cross sectional view of the detecting device taken along the line III—III in FIG. 2.

FIG. 2 is a cross sectional view taken along the line II—II in FIG. 1, and FIG. 3 is a transverse cross sectional view taken along the line III—III in FIG. 2.

FIG. 1 shows a differential carrier 50 provided with a differential gear therein and used in a rear wheel drive vehicle fitted with independent suspension on all four wheels.

A drive shaft 52 is connected to a wheel, and a power output shaft 53 having a flange portion 53a is connected to the flange portion 52a of the drive shaft 52, which projects out of the differential carrier 50.

The power output shaft 53 and the drive shaft 52 are connected to each other at the respective flange portions 53a and 52a thereof by a plurality of screwbolts 54, to rotate as one body.

As shown in FIG. 1, the screw-bolts 54 also connect a rotating body 1 to the power output shaft 53 and the drive shaft 52, as a moving portion of this invention.

The rotating body 1 is made of a ferromagnetic material and is provided with a cylindrical portion 1a having a smooth cylindrical surface formed across the entire external spherical surface of the body 1 along the rotating direction thereof, and a bottom portion 1b of the cylindrical portion 1a connected to the flange portion 53a of the power output shaft by the screwbolts 54.

A detecting portion 2, which detects the speed of a wheel by detecting the rotational speed of this rotating body 1, is also provided. This detecting portion 2 is referred to herein as a magnetic field detecting means according to the present invention, and is firmly fixed to the differential carrier 50 by a plurality of screwbolts 55.

A detailed construction of the detecting device 2 of this invention will be described hereunder with reference to FIG. 2 and FIG. 3.

A housing of the detecting device 2, made of a nonmagnetic material, comprises a housing portion 3 having a cylindrical space formed vertically inside thereof and a sensor 4 fixedly mounted on the housing portion 3 opposite to the cylindrical portion 1a of the rotating body 1 with a predetermined gap therebetween (usually about 1 mm).

The housing portion 3 and the sensor 4 are integrally fabricated as one body, from the same material, and therefore, the sensor 4 serves as a bottom wall of the housing portion 3.

Provided inside the housing portion 3, are a core portion 5 serving as the magnetizing means of this invention and made of a ferromagnetic material and having a rod like shape with a circular cross section, a coil 7 wound on a bobbin 6 provided around the core portion 5, and a circuit substrate 8 having a flat shape and arranged in parallel to the coil 7 as shown in FIG. 1.

A bottom portion of the core portion 5 is formed into a semi-spherical shape 5a which extends to and is implanted in the sensor 4.

A groove 4a is formed on the lower surface of the sensor 4, in parallel to and opposite the cylindrical portion 1a of the rotating body 1, and two detecting magnetic path portions 9, 10 made of a ferromagnetic material and having a circular cross section, and having a configuration identical to the outer surface of the cylindrical portion 1a of the rotating body 1, are implanted in the groove 4a.

These detecting magnetic path portions 9, 10 grip a Hall element 11, having a cylindrical configuration and forming a magnetic field detecting means, at both sides thereof in the groove 4a. The detecting magnetic path portions 9, 10 have an identical shape and are arranged linearly in the same direction as that of the rotation of the rotating body 1. Further, the Hall element 11 is positioned in the vicinity of the core portion 5.

A cord bushing 12 is pressed into a top end opening portion of the housing portion 3 and a lead wire 13 connected to the coil and circuit board 8 is led out of the inside of the housing portion 3 through the cord bushing 12.

One end of the sensor portion 4 is extended along the external surface of the cylindrical portion 1a of the rotating body 1, i.e., along the rotational direction of the rotating body 1, and at the end portion 4b of the extended portion thereof, a permanent magnet 14 having a magnet pole formed transversely to the surface of the cylindrical portion 1a, is provided.

Further, a cover 16 for fixing the permanent magnet 14 is provided.

In this example, the intensity of the magnetic force of the permanent magnet 14 and the distance of the position at which the magnet 14 is disposed apart from the detecting magnetic path portion 9 or 10 is determined in such a way that the magnetic field caused by the permanent magnet 14 does not directly affect the detecting magnetic path portions 9 and 10.

A plurality of lead wires 13 led from the detecting device 2 are connected to a signal processing circuit 15 for processing a signal related to a rotational speed of the rotating body detected by the detecting device 2.

Hereafter, the construction of the signal processing circuit 15 of this invention will be explained with reference to FIG. 4.

Figure 4:
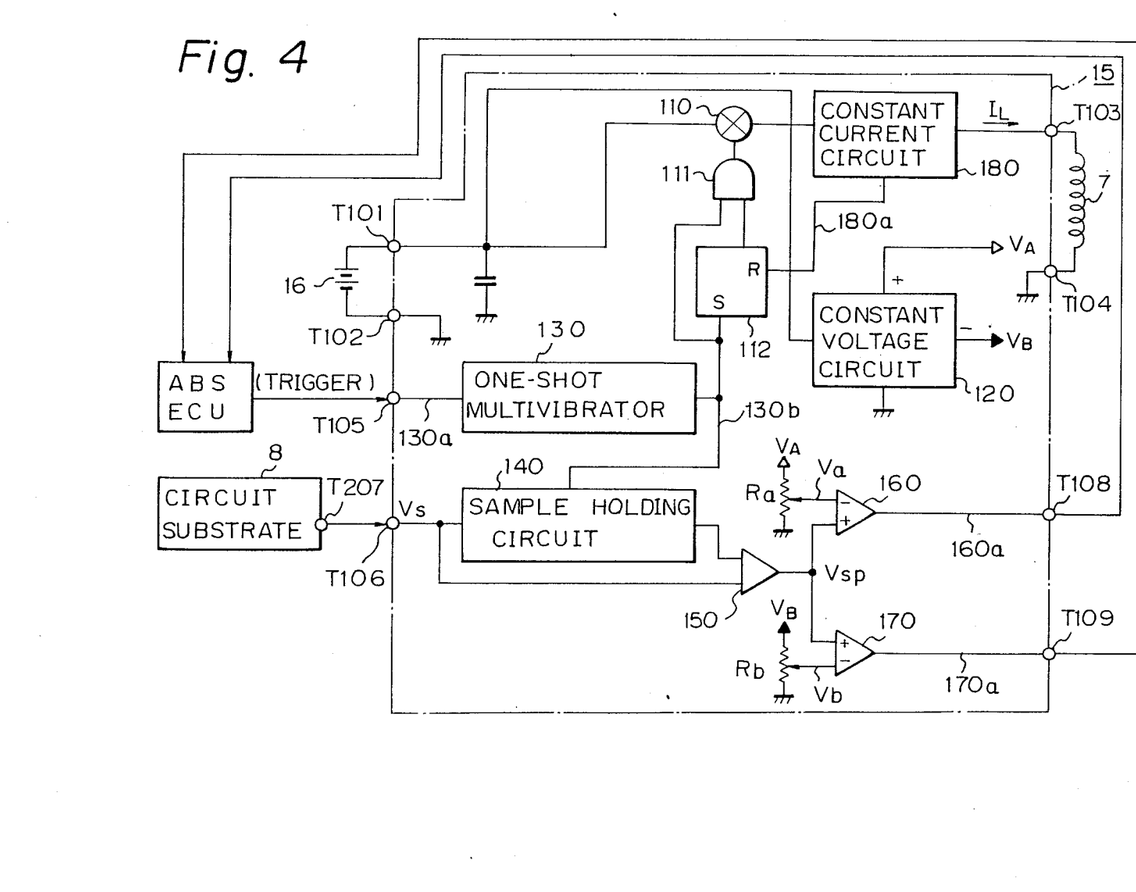
FIG. 4 is a detailed block diagram of the signal processing circuit shown in FIG. 1.

In FIG. 4, an electric power receiving terminal T101, to which electric power is supplied from a battery 16, and a grounding terminal T102 are provided in this circuit.

The battery 16 also supplies electric power to a circuit provided on the circuit substrate 8, as described later. Coil connecting terminals T103 and T104 are connected to a coil 7 through the lead wires 13 as shown in FIGS. 1 and 2, and a trigger signal input terminal T105 is connected to, for example, an Anti Lock Brake System (referred to as ABS hereinafter) which requires a signal for a rotational speed of a wheel or the like, and trigger signals are input thereto at a predetermined timing, to measure the rotational speed of the rotating body.

Further, another signal input terminal T106, to which an amplified output voltage signal from the Hall element 11 as shown in FIG. 2, is input, and output terminals T108 and T109 from which speed signals in a positive or reverse direction of this rotating body 1 as shown in FIG. 2 are output, are provided.

Moreover, a switching circuit 110 connected to the electric power supply terminal T101, a constant voltage circuit 120, one shot multivibrator 130, a sample holding circuit 140, an amplifier 150, comparators 160 and 170, and a constant current circuit 180 for controlling the electric current flowing into the coil 7 connected thereto through the coil connecting terminal T103, are provided.

Also, an AND gate 111, a flip flop circuit 112, variable resistors $R_a$, $R_b$ dividing a positive (+) voltage Va and negative (−) voltage $V_B$ of the constant voltage circuit 120 by a predetermined ratio and supplying a partial potential thus obtained to the comparators 160 and 170, are provided.

Figure 5:
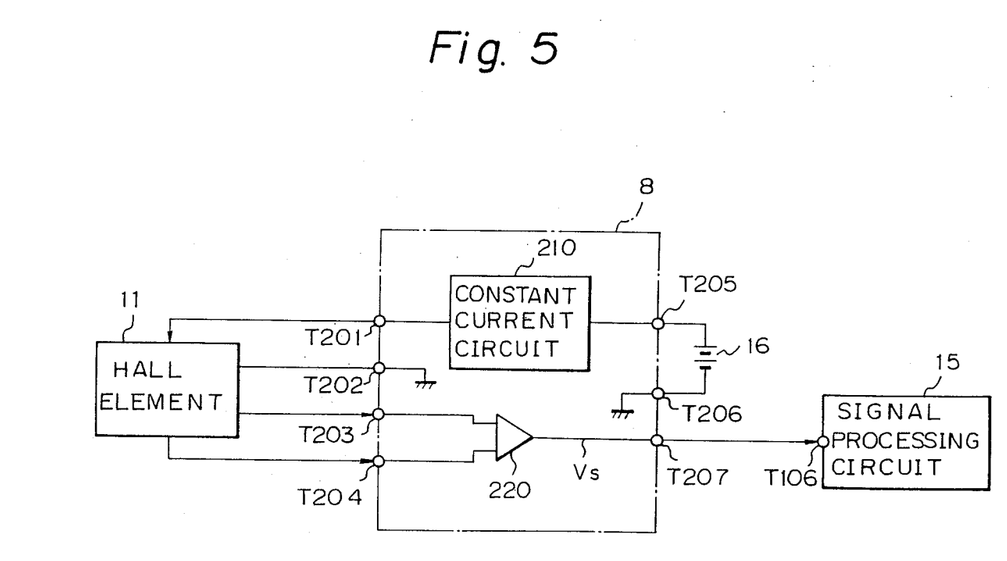
FIG. 5 is a block diagram of the circuit substrate 8 shown in FIG. 1.

Furthermore, as shown in FIG. 5, a circuit consisted of a buffer circuit for carrying out an impedance conversion of the electric voltage of the Hall element 11 is provided on the circuit substrate 8 in the detecting device 2.

In FIG. 5, electric power supply terminals T201, T202 connected to the Hall element 11 and supplying electric power to the Hall element 11, and input terminals of the output voltage T203 and T204, for inputting the output voltage of the Hall element 11 thereto, are also provided.

Further, an electric power supply terminal T205 connected to the battery 16 as described above, a grounding terminal T206, a constant current circuit 210 supplying a constant current to the Hall element 11 through the current supply terminals T201 and T202, and a differential amplifier 220 outputting a signal output from a signal outputting terminal T207 by converting the output voltage signal of the Hall element 11 received at the input terminals T203 and T204 for the voltage signal into a signal having a low impedance, are provided.

The function of the device for detecting the speed of rotation of a moving body in the first embodiment of this invention mentioned above, will be explained with reference to the timing chart shown in FIG. 6.

Figure 6:
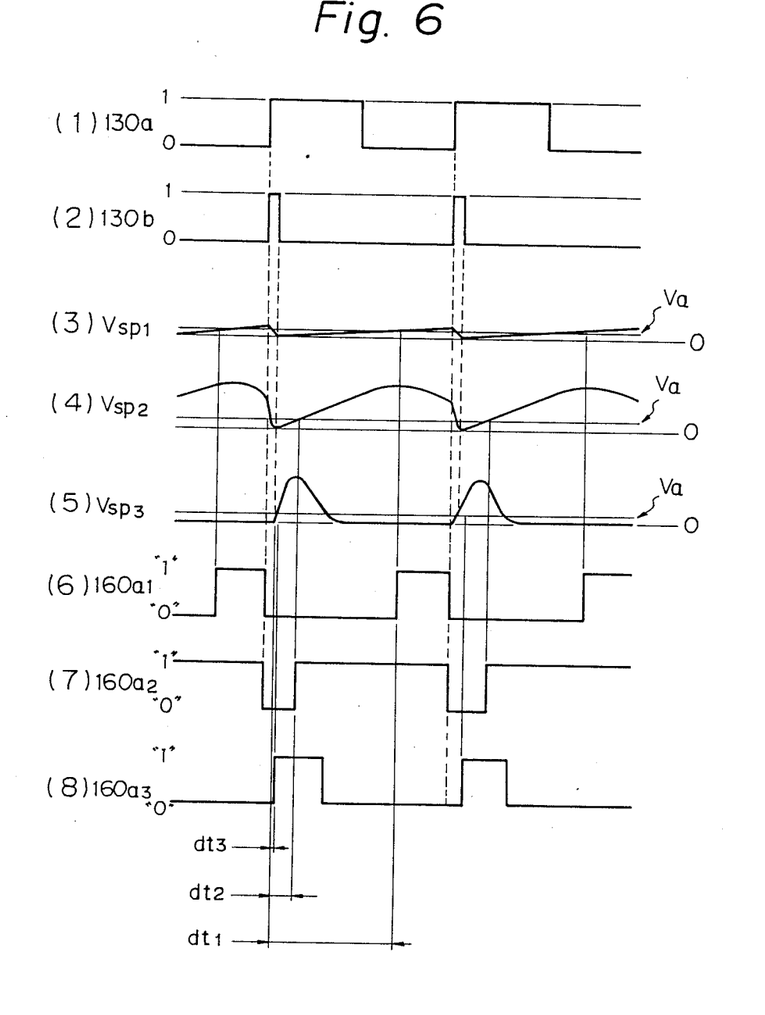
FIGS. 6 to 8 illustrate a function of the first embodiment of the present invention.

In FIG. 6, a signal 130a is a trigger signal for starting the measurement of the speed of rotation of the rotating body 1, and is input to the trigger signal input terminal T105 of the signal processing circuit 15 as shown in FIG. 4 from the ABS or the like. This signal is usually input to the trigger signal input terminal at a frequency of approximately 5 m/sec.

Namely, the controlling device such as the ABS consisting of a microprocessor, usually carries out a processing operation and control operation at a constant frequency, and thus the signal processing circuit has a configuration such that the aforementioned trigger signal 130a for starting the measurement of the speed of rotation is input from a predetermined port of the controlling device such as the ABS and therefore the signal for the speed of rotation of the rotating body 1 is output from the speed of rotation signal output terminal T108, T109 as shown in FIG. 4 only when the speed of rotation signal of the rotating body 1 is required.

As shown in FIGS. 4 and 6 the trigger signal 130a is input, the one shot multivibrator 130 of the signal processing circuit 15 generates a one shot pulse signal 130b synchronized with the leading edge of the trigger signal 130a, and turns ON the switching circuit 110 because of the flip flop 112 which is set by the ON signal of the one shot pulse 130b, causing the AND gate 111 to be turned ON.

When the switching circuit 110 is ON, the voltage of the electric power source is applied to the coil connecting terminal T103 through the constant current circuit 180 and an electric current $I_L$ is supplied to the coil 7 of the detecting device 2 connected to the terminal T103.

The function of the constant current circuit 180 will be explained with reference to FIG. 7 and FIG. 4.

Figure 7:
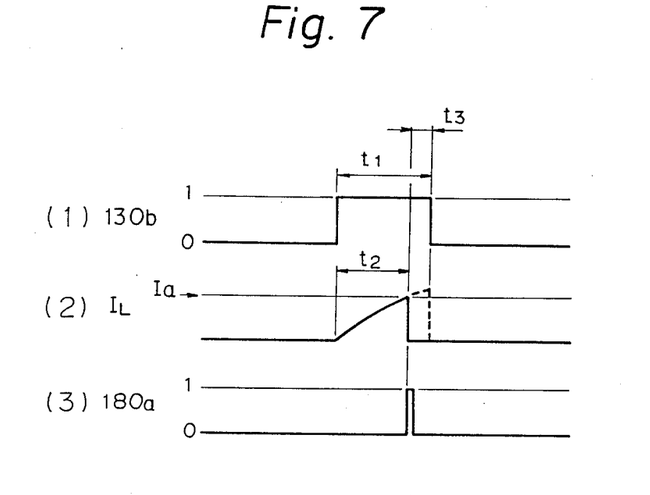

The current $I_L$, supplied to the coil 7 by the one shot pulse signal 130b generated by the one shot multi-vibrator 130, as mentioned above, will increase with the elapse of time due to the inductance of the coil 7, as shown in FIG. 7, and when the current $I_L$ reaches the predetermined current value $I_a$ set by the constant current circuit 180, the signal 180a is output by the constant current circuit 180 to reset the flip flop 112 and thereby turn the switching circuit 110 OFF.

In this Example, the time $t_1$ for which the one shot pulse 130b of the one shot multivibrator 130 is ON is set to be slightly longer than the time $t_2$ in which the current $I_L$ of the coil 7 will reach the predetermined value $I_a$, from the initial condition, i.e., 0 volt.

This difference $t_3$ is, for example, about 60 μsec.

Accordingly, even if variations occur in the power source voltage, the final value of the current $I_L$ of the coil is maintained at the constant value $I_a$.

As described above, when an electric current $I_L$ is supplied to the coil 7 for a short time interval set by the one shot pulse 130b, due to the trigger signal 130a and the reset signal 180a of the constant current circuit 180, the magnetic flux, generated by the core 5 as shown in FIG. 2 crosses the rotating body 1 disposed therefrom at a predetermined space gap (about 1 mm) at a right angle to the direction of rotation of the rotating body 1, and magnetizes the rotating body 1 to form a point magnetic pole on the surface 1a of the rotating body 1.

Accordingly as shown in FIGS. 2 and 3, since the Hall element 11 and the detecting magnetic path portions 9 and 10 are arranged along the direction of rotation of the rotating body 1 on the under surface of the sensor portion 4 of the detecting device 2, the Hall element 11 detects the magnetic flux existing on the spherical surface of the cylinder portion 1a of the rotating body 1.

Therefore, when the rotating body 1 rotates, the Hall element generates an output voltage due to the point magnetic pole formed on the rotating body 1 described above, passing just in front of the Hall element 11, and the output voltage of the Hall element 11, is input at the input terminals T203 and T204 of the circuit substrate 8 to cause an output of a voltage $V_s$ from the terminal T207 of the substrate 8 through the differential amplifier 220 as shown in FIG. 5.

Figure 8:
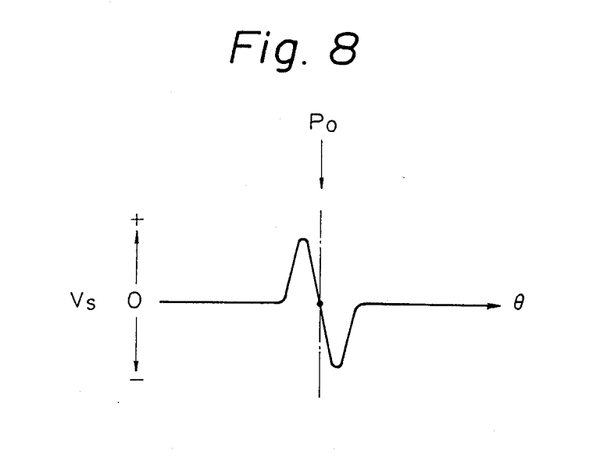

In FIG. 2 the point magnetic pole formed on the surface of the rotating body 1 exists just in front of the Hall element 11, (here the turning angle is referred to as Po) the value of the output voltage $V_s$ of the hall element 11 is 0 V, as shown in FIG. 8, because the magnetic field formed by the point magnetic pole is linked with both of the detecting magnetic path portions 9 and 10 in an equal amount, and the respective magnetic fields pass therethrough in opposite directions.

Further, when the point magnetic pole mentioned above, is displaced due to the rotation of the rotating body 1, the amount of the magnetic field formed by the point magnetic pole linked with the aforementioned detecting magnetic path portions 9 and 10 will be gradually increased, to make the output voltage Vs described above gradually increased as a positive or negative voltage corresponding to the direction of rotation of the rotating body 1.

Moreover, when the point magnetic pole described above is further displaced with the rotation of the rotating body 1 to reach the outer end of either of the detecting magnetic path portions 9 and 10, the voltage Vs will reach a peak value either as a positive or a negative voltage as shown in FIG. 8.

Subsequently, the voltage Vs will become 0 V again with a further successive displacement of the point magnetic pole due to a further rotation of the rotating body 1.

Although the output voltage Vs of the Hall element 11 represents a relative positional relationship between the point magnetic pole formed on the rotating body 1 and the detecting device 2, it can represent the turning angle of the rotating body 1 because the diameter of the body 1 is a constant value.

Note, in this invention, since the Hall element 11 and the aforementioned core 5 are adjacently arranged so as to dispose both centers thereof on a line formed at a right angle to the identical longitudinal center axis of the detecting magnetic path portions 9 and 10 as shown in FIG. 3, the magnetic field formed by the core 5 can be linked with the detecting magnetic path portions 9 and 10 in an opposite direction respectively, and therefore the magnetic field formed by the core 5 does not affect the output voltage Vs.

The output voltage Vs of the Hall element 11 is input to the signal input terminal T106 as shown in FIG. 4 through a lead wire 13 extending outwardly from the detecting device 2, and the output voltage Vs of the Hall element 11, at the trailing edge of the output signal 130$b$ i.e., one shot pulse, of the one shot multivibrator 130, is held by the sample holding circuit 140.

The output voltage Vs at this time is the voltage existing just after the point magnetic pole mentioned above is formed on a part of the rotating body 1 by supplying an electric current to the coil 7 wound around the core 5 in a short period, the point magnetic pole exists in front of the core 5, i.e., in front of the Hall element 11 as described above, and accordingly, the voltage Vs, which is nearly zero (Vs$\approx$0), is held in the sample holding circuit 140.

Thereafter, the output voltage Vsp obtained from the differential amplifier 150 is the difference between the value of the output voltage held in the sample holding circuit 140 and the current output voltage Vs, both of which are input to the differential amplifier 150.

According to this embodiment, no influence of the offset of the voltage caused by the Hall element 11 is felt. Therefore, detecting errors are minimized because the Hall element is not affected by the various magnetic fields caused by a direct current passing through and influencing the Hall element 11 from outside the detecting device 2.

The output voltage Vsp of the amplifier 150, is 0 V just after a portion of the rotating body 1 is magnetized by the core 5, i.e., at a trailing edge of the one shot pulse 130$b$, as described above, and thereafter, the value thereof is increased or decreased in accordance with the rotation of the rotating body 1.

When the rotating body 1 is rotating in a predetermined direction, the output voltage Vsp is gradually increased, as the voltage Vsp$_1$ shown in FIG. 6, when the rotating body 1 is rotating at a low rotational speed, and the output voltage thereof is increased to be slightly more than the previous voltage when the rotating body 1 is rotating at a middle rotational speed, as the voltage Vsp$_2$ shown in FIG. 6.

When the rotating body 1 is rotating at a high rotational speed, the output voltage Vsp is sharply increased as the voltage Vsp$_3$ shown in FIG. 6.

A predetermined threshold voltage Va is applied to the reference terminal of the comparator 160 as shown in FIG. 4, and therefore, the output 160$a$ of the comparator 160 is 160$a_1$, 160$a_2$ and 160$a_3$ at a low, a middle, and a high rotational speed, respectively. As mentioned above, to make the output voltage Vsp of the amplifier 150 represent the angle of turn of the rotating body 1, the time in which the voltage Vsp reaches the voltage Va, namely, the time dt$_1$, dt$_2$, and dt$_3$ defined from the time when the trailing edge of the one shot pulse 130$b$ appears as mentioned above, until the time that the output voltages 160$a_1$, 160$a_2$ and 160$a_3$ of the comparator 160 respectively, are in inverse proportion to the rotational speed of the rotating body 1.

The variable resistor Ra sets the threshold voltage Va described above by dividing the positive ($+$) output voltage V$_A$ of the constant voltage circuit 120 at a predetermined ratio in the manner explained above, and the signal related to the speed of rotation of the rotating body 1 in the predetermined direction can be obtained at the terminal T108.

As shown in FIG. 8, the output voltage Vs of the amplifier 150 is negative when the rotating body 1 rotates in the reverse direction.

As this time, the rotational speed signal 170$a$ of the rotating body 1 rotating in the reverse direction can be obtained at the terminal T109 by inputting both the threshold voltage V$_b$ set by dividing the negative side ($-$) output voltage V$_B$ of the constant voltage circuit 120 utilizing a variable resistor R$_b$ to make a potential and the output voltage Vsp mentioned above, into the input terminal of the comparator 170.

The point magnetic pole formed by magnetizing a part of the rotating body 1 by the core 5 is demagnetized and eliminated when passing through the portion located in front of the permanent magnet 14 disposed opposite to the external surface of the rotating body 1 and having an opposite polarity to the magnetic field formed by the core 5 in accordance with the rotation thereof.

As described above, the detecting device 2 of this embodiment can be used for controlling the ABS system in such a way that, when the detecting device 2 receives a trigger signal for starting the measurement from, for example, the ABS, a point magnetic pole is formed on the part of the rotating body 1, and thereafter, the displacement thereof is detected by this device to measure the angle of turn of the rotating body 1 and the time required by the rotating body 1 to rotate through a predetermined turning angle (for example, about 0.2 degree when utilizing a rotating body having a radius of 30 mm) is obtained therefrom and output as the speed of rotation of the rotating body 1, depending upon the rotating direction.

In this embodiment, the trigger signal 130$a$ of the signal processing circuit 15 is input from the ABS controlling circuit, but the trigger signal 130$a$ can be obtained by an oscillating circuit (not shown) generating a trigger signal at a predetermined constant frequency and provided in the signal processing circuit 15.

Accordingly, a duty signal reversely proportional to the speed of rotation of the rotating body 1, depending upon the rotational direction, can be output from the output terminals T108 and T109 of the signal processing circuit 15.

Further, in this embodiment, the rotating body 1 is made of a ferromagnetic material and has a cylindrical shape, but the rotating body 1 may have a cylindrical shape and a solid core, for example, and may be made of a nonferromagnetic material with a ferromagnetic material such as nickel deposited on the surface of the nonmagnetic rotating body, by a plating or deposition method.

As the Hall element 11 of this invention, another magnetic field detecting device, for example, a magnetoresistance element, also can be used, and when the detecting coil is wound around the detecting magnet path portions 9 and 10, the angular velocity of the rotating body 1 can be obtained from that coil.

The detecting device 2 of this invention is described as a detector for detecting the speed of rotation and the angle of turn of the rotating body 1, but the device 2 can be used as a detector for detecting a longitudinal traveling speed of an article made of a ferromagnetic material, such as a rolled plate or the like, without contact therewith except for detecting the angle of turn of the rotating body 1. In such a case, the permanent magnet 14 and the detecting magnetic path portions 9 and 10 are arranged in a plane along the surface of the rolled plate.

In this invention, the signal processing circuit 15 has a configuration such that the output signals 160a and 170a are inverted in proportion to the speed of rotation of the rotating body 1 by comparing the output voltage Vsp of the amplifier 150 with the predetermined threshold voltage $V_a$ or $V_b$, but since the value of the output voltage Vs of the Hall element 11 will peak when the rotating body 1 is turned through a predetermined angle, and thereafter will be reduced, the signal processing circuit 15 may have a configuration such that the signal inverted in proportion to the speed of rotation of the rotating body 1 may be output by measuring the time at which the output voltage $V_s$ of the Hall element 11 reaches a peak value since the point magnetic pole is formed on a part of the rotating body 1, by utilizing the aforementioned characteristic.

Furthermore, in this invention, the threshold voltage $V_a$ or $V_b$ is set at a predetermined value by adjusting the variable resistor $R_a$ or $R_b$, but may be a constant value if required.

Moreover, when the speed of rotation of the rotating body 1 rotating through a fine turning angle is detected, the threshold voltage $V_a$ or $V_b$ must be set closer to 0 V. But, when the threshold voltage is set as mentioned above, an error in the detection will occur because, due to the fine high frequency noises included in the output voltage Vsp of the amplifier 150, the output voltage Vsp and the threshold voltage $V_a$ or $V_b$ will cross even when the rotation of the rotating body 1 is stopped, i.e., the output voltage Vsp is 0 V. Therefore, the threshold voltage $V_a$ may be set to a predetermined value when a leading edge of the trigger signal 130a appears, and thereafter, gradually reduced to 0 V. The threshold voltage $V_b$ also may be set in the same manner as described above.

According to this construction, the detecting device 2 not only has a high flexibility with regard to the high frequency noises described above but also has the ability to easily detect the speed of rotation when the rotating body 1 rotates through a fine turning angle, i.e., rotates at an extremely low speed of rotation.

The Hall element 11 may be omitted an variation of the magnetic field formed by the point magnetic pole, caused by the rotation of the rotating body 1, may be detected by arranging a magnetoresistive element such as a resistive element made of a ferromagnetic film or an electromagnetic coil in the vicinity of the rotating body 1.

Figure 9:
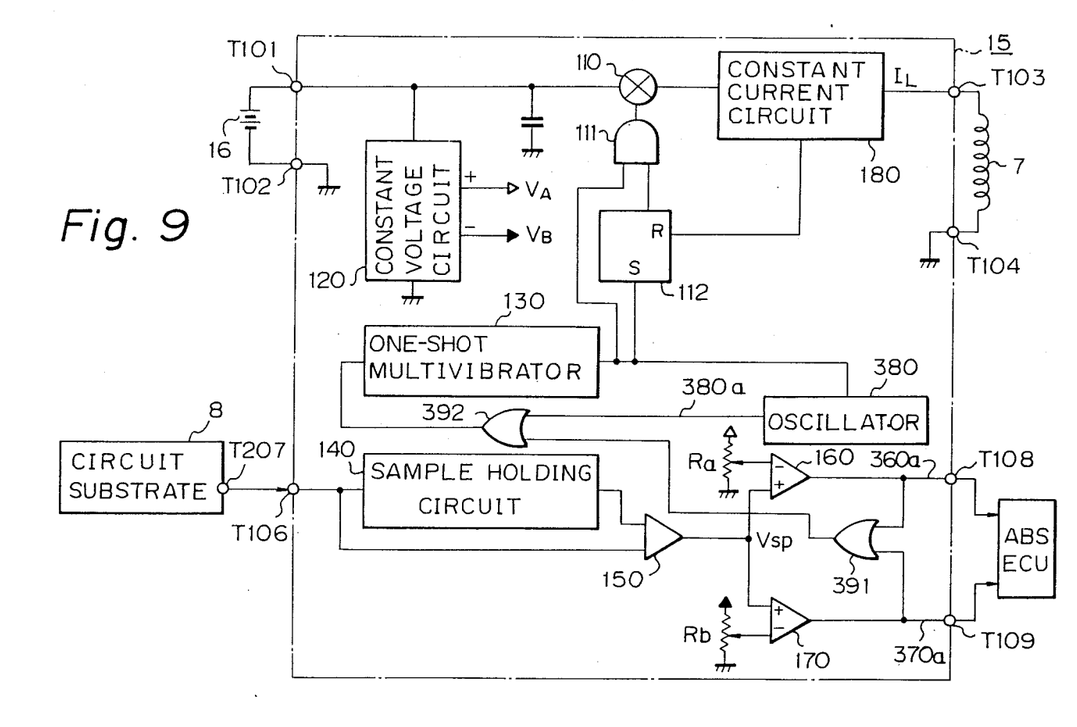
FIG. 9 is a detailed block diagram of the signal processing circuit of the second embodiment of the present invention.

A second embodiment is now described, in which the signal processing circuit 15 of the device for detecting this speed of transference of a moving body of the first embodiment is replaced by a different circuit.

In FIG. 9, the same elements as disclosed in FIG. 4 are given the same reference numbers.

The signal processing circuit 15 is provided with the terminals T101, T102, T103, T104, T106, T108, and T109, and the terminals T101 and T102, the terminals T103 and T104, and the terminal T106 are connected to the power source 16, the coil of the detecting device 2 and the signal output terminal T207 of the circuit substrate 8 consisting of a buffer circuit for transforming the impedance of the output voltage of this Hall element, and further, the signal for the speed of rotation of the rotating body 1 is output from either T108 or T109 in accordance with the direction of rotation of the rotating body 1.

In this example, the signal processing circuit 15 is not provided with the trigger signal input terminal for starting the measurement operation (such as a terminal T105 shown in FIG. 4), but the trigger signal for triggering the one shot multivibrator 130 is obtained by inputting the output signals 360a and 370a of the comparators 160 and 170 to the OR circuit 391.

Therefore, the trigger signal can be sent to the one shot multivibrator 130 again when the point magnetic pole of the rotating body 1 is displaced by a predetermined angle caused by the rotation of the body 1 after the point magnetic pole is formed on a part of the rotating body 1.

Each output signal 360a or 370a of the comparator 160 or 170 corresponds to the direction of rotation of the rotating body 1 and represents a rectangular pulse wave having a cycle inversely proportional to the speed of rotation of the rotating body 1.

Accordingly, the signal proportional to the speed of rotation of the rotating body 1 can be obtained by counting the frequency of the output rectangular pulse wave.

In this second embodiment, as explained above, the detecting device has a construction such that a new point magnetic pole is formed by detecting the displacement of the point magnetic pole previously formed on the part of the rotating body 1.

Accordingly, in the initial stage of the rotating body 1 in which a magnetic pole does not exist on the part of the body 1, the rectangular pulse wave output having a frequency proportional to the speed of rotation of the rotating body 1 can not be obtained even when the body 1 is rotated, because there is no displacement of the point magnetic pole by the rotation of the body 1, and therefore, a new point magnetic pole can not be created.

Accordingly, in this embodiment, an oscillating circuit 380 outputting the one shot pulse 380a having a predetermined cycle of an extremely short period (for example, 0.1 Hz) therefrom is provided, and the trigger signal for triggering the one shot multivibrator is obtained by inputting the one shot pulse 380a and either the output signal 360a or 370a of the comparator 160 or 170 to the OR circuit 392.

Namely, in this embodiment, even in the initial condition in which no magnetic pole exists on any portion of the rotating body, the trigger signal magnetizing the rotating body can be forcibly created, and further, in this embodiment, when the oscillating circuit 380 is reset by the output pulse of the one shot multivibrator 130, an unnecessary magnetization of the rotating body 1 caused by the output frequency of the oscillating circuit 380, can be avoided, and therefore, the output signal 360a or 370a of the comparator 160 or 170 is not affected by the oscillating circuit 380.

The oscillating circuit 380 of this embodiment provides a trigger signal, for forcibly forming a magnetic pole at only one portion of the rotating body 1 at the initial stage of the rotating body 1, to the one shot multivibrator 130.

Accordingly, in this invention, a one shot multivibrator which can provide a one shot pulse when the voltage of the electric current supply terminal T301 is initiated i.e., when the terminal is just connected to the electric power source, also may be used instead of the oscillator 380.

A third embodiment of the device for detecting a speed of displacement according to this invention will be explained with reference to FIG. 10 and FIG. 11, which is a cross sectional view taken along the line I—I in FIG. 10.

Figure 10:
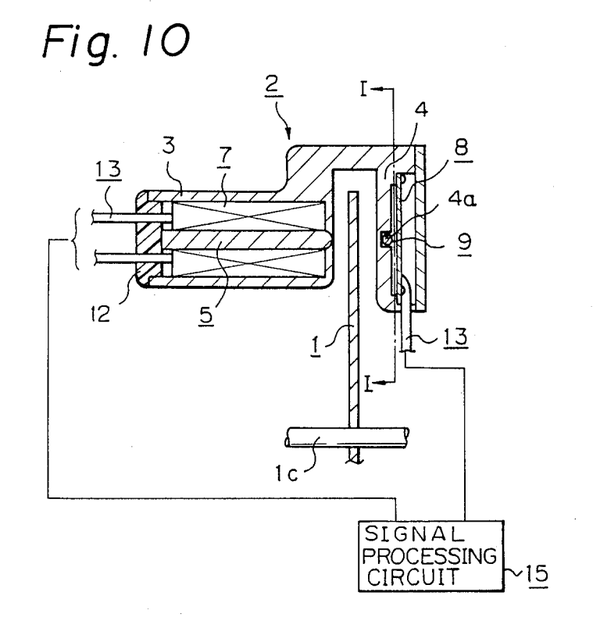
FIG. 10 is a cross sectional view of a third embodiment of the detecting device of the present invention; and, FIG. 11 is a cross sectional view of the detecting device taken along the line I—I in FIG. 10.
Figure 11:
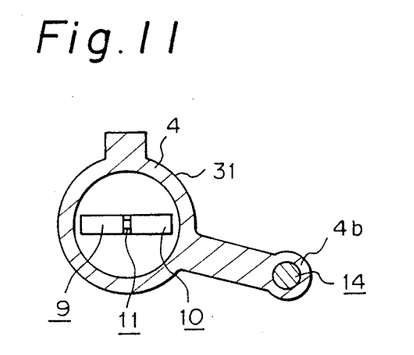

In FIGS. 10 and 11, the same elements having the same function as in the first embodiment are given the same number.

In FIGS. 10 and 11, the difference between the first and third embodiments is that, in this embodiment, the rotating body 1 made of a ferromagnetic material is a circular plate having a rotational axis 1C. Therefore, the detecting device 2 has a configuration such that at least both surfaces of a part of the circular plate of the rotating body 1 are covered.

Namely, in this detecting device 2 of embodiment, in a housing portion 3 containing a coil 7 and a core 5 and a sensor portion 4 provided with detecting magnetic path portions 9 and 10, a Hall element 11, and a circuit substrate 8 are arranged opposite to each other with the rotating body 1 therebetween.

In this detecting device 2, the core 5 made of a ferromagnetic material is arranged at a right angle to the rotating body 1 and a permanent magnet 14 for demagnetizing the magnetic pole formed on the rotating body 1 is also provided on end portion 4b extended in parallel to the rotating body 1.

Further, as the first embodiment, a lead wire 13 extended outwardly from the coil 7 through the cord bushing 12 is provided, and therefore, when an electrical current is applied to the coil 7 from the signal processing circuit 15, a point magnetic pole is formed on a part of the surface of the rotating body 1 facing the coil 7.

The Hall element 11 is arranged opposite to the core 5 and on an extended axis line of the core 5, with the rotating body 1 therebetween, and the Hall element 11 is fixedly mounted in the groove 4a formed in the sensor portion 4 and gripped by the detecting magnetic path portions 9 and 10 disposed in a predetermined direction for detecting a magnetic field, the direction of which is parallel to the surface of the rotating body 1.

The Hall element 11 of this embodiment is supplied with a constant electric current from the circuit substrate 8 provided inside the sensor portion 4, and the out put thereof is output to the signal processing circuit 15 through a lead wire 13 with an impedance transformation.

When a point magnetic pole is formed on a portion of the rotating body 1, the output voltage of the Hall element 11 is 0 V just after the point magnetic pole is formed, but when the rotating body 1 rotates continuously, the direction of rotation and the speed of rotation of the rotating body 1 can be detected by the variation of the output voltage of the Hall element 11, depending upon the rotating direction, and the speed of rotation of the rotating body 1 is processed by the signal processing circuit 15.

The detecting method is the same as that of the first embodiment. In the first embodiment, however, when the gap between the detecting device 2 and the rotating body 1 is varied and is not constant, due to an error caused by an elapse of time or a manufacturing process, the intensity of magnetization of the point magnetic pole is also varied in accordance with the variation of the gap, and further, the number of magnetic flux formed by the point magnetic pole crossing the Hall element 11 will be varied, to cause an error in the detected speed of the rotating body 1.

Conversely, in this third embodiment, the device for detecting the speed of displacement of a moving body has a configuration such that, for example, even when the gap between the rotating body 1 and the core 5 is narrowed, to increase the intensity of the magnetization of the point magnetic pole formed on the rotating body 1, the gap between the rotating body 1 and the Hall element 11 is simultaneously enlarged to reduce the ratio of the magnetic flux formed by the point magnetic pole and passing through the Hall element 11.

Accordingly, since the output voltage of the Hall element 11 is maintained at a constant value, a stable detection of the speed of rotation can be carried out regardless of the relative positional displacement of the rotating body 1 and the detecting device 2.

EFFECT OF THE INVENTION

As described above, the device for detecting the speed of displacement of a moving body according to this invention, has a configuration as mentioned above such that the magnetic field from a magnetic pole once formed by a magnetizing means on the surface of a moving body during the movement thereof, passes through before the magnetic field detecting means moves with the movement of the moving body. The magnetic field detecting means then outputs a voltage representing the variation of the magnetic filed thus detected, and the speed of displacement of a moving body can be continuously obtained by processing the signal output from the magnetic field detecting means, in the output signal processing means.

Accordingly, in this invention, it is possible to continuously obtain a signal corresponding to the speed of displacement of a moving body, and therefore, the moving body need not be precisely fabricated with a specific configuration, such as forming concave and convex portions on the surface of the moving body, and moreover, a superior effect of continuously obtaining precise information about the speed of the moving body, even when the moving body moves at an extremely low speed, and thus an increment of a ripple and a phase shift can not occur, can be obtained.

We claim:

1. A device for detecting a speed of movement of a moving body, a speed of which is to be measured, having a surface made of a magnetic material, comprising:

magnetizing means, disposed in the vicinity of said moving body, for forming a point magnetic pole on a surface of the moving body to move therewith, magnetic field detecting means, provided adjacent to said moving body, for detecting a magnetic field of the magnetic pole formed on said surface by said magnetizing means, and producing a voltage in accordance with a variation of said magnetic field caused by the movement of said moving body, both said magnetizing means and said magnetic field detecting means being spaced from said moving body on a same straight line extending in a direction perpendicular to a direction of movement of said moving body; and output signal processing means for processing a signal output by said magnetic field detecting means for determining the speed of movement of said moving body.

2. A device for detecting a speed of movement of a moving body, a speed of which is to be measured, having a surface made of a magnetic material, comprising:

magnetizing means, disposed in the vicinity of said moving body, for forming a point magnetic pole on the surface of the moving body to move therewith, magnetic field detecting means, provided adjacent to said moving body, for detecting a magnetic field of the magnetic pole formed on said surface by said magnetizing means and for outputting a voltage in accordance with a variation of said magnetic field caused by the movement of said moving body; and output signal processing means for processing a signal output by said magnetic field detecting means and for determining the speed of movement of said moving body, both said magnetizing means and said magnetic field detecting means being spaced from said moving body on a same straight line extending in a direction perpendicular to a direction of movement of said moving body; and said output signal processing means further including means for detecting a time when said magnetic pole is formed by said magnetizing means and detecting a speed of movement of said moving body from a time after said detected time at which said magnetic pole is formed until a time when said voltage generated by said magnetic field detecting means reaches a predetermined value.

3. A device for detecting a speed of movement of a moving body, a speed of which is to be measured, having a surface made of a magnetic material, comprising:

magnetizing means disposed in the vicinity of said moving body for forming a point magnetic pole on the surface of the moving body to move therewith;

magnetic field detecting means provided adjacent to said moving body, for detecting a magnetic field of the magnetic pole formed on said surface by said magnetizing means and for outputting a voltage in accordance with a variation of said magnetic field caused by the movement of said moving body, both said magnetizing means and said magnetic field detecting means being spaced from said moving body on a same straight line extending in a direction perpendicular to a direction of movement of said moving body; and output signal processing means for processing a signal output by said magnetic field detecting means for determining a speed of movement of said moving body, said magnetizing means further comprising a demagnetizing means for forcibly eliminating, after said determining, said magnetic pole formed on the surface of said moving body.

4. A device for detecting the speed of moving of a moving body, according to any one of claims 1 to 3, wherein said magnetizing means comprises a core portion made of a magnetic material and an electromagnetic coil wound around said core portion.

5. A device for detecting the speed of moving of a moving body according to claim 4 wherein said core portion of said magnetizing means is provided with a tip end portion at least at one end thereof, said tip end portion being closer to the surface of said moving body than the rest of said magnetizing means and both said tip end portion and a center portion of said magnetic field detecting means being arranged in a line perpendicular to the moving direction of said moving body.

6. A device for detecting the speed of moving of a moving body according to any one of claims 1 to 3, wherein said output signal processing means determines said speed of moving of said moving body from data output by said magnetic field detecting means when said magnetic pole is formed by said magnetizing means and a current data output by said magnetic field detecting means.

7. A device for detecting the speed of moving of a moving body according to any one of claims 1 to 3, wherein said magnetic field detecting means further comprises a Hall element or providing a high density detecting of the magnetic field of the magnetic pole formed by said magnetizing means.

8. A device for detecting the speed of moving of a moving body according to any according to any one of claims 1 to 3, wherein said magnetic field detecting means further comprises at least two magnetic path devices each having a linear configuration and definite longitudinal lengths respectively and said devices are arranged in series in the longitudinal direction thereof and parallel to the moving direction of said moving body, and said Hall element is provided in a center portion of said magnetic field detecting means formed between the respective ends of both of said magnetic path devices and arranged opposite to each other, to provide a high density linking therewith of the magnetic field of the magnetic pole formed by said magnetizing means.

9. A device for detecting a speed of moving of a moving body according to any one of claims 1 to 3, wherein said magnetizing means and said magnetic field detecting means are arranged adjacent to each other on a same surface of said moving body.

10. A device for detecting the speed of moving of a moving body according to any one of claims 1 to 3, wherein said moving body has a plate-like configuration and said magnetizing means and said magnetic field detecting means are arranged opposite to each other with said moving body therebetween.

11. A device for detecting the speed of moving of a moving body according to any one of claims 1 to 3, wherein said signal processing means includes means for periodically initiating said magnetizing means to form said magnetic pole, and for subsequently detecting said speed of moving.

12. A device for detecting a speed of movement of a moving body, a speed of which is to be measured, having a surface made of a magnetic material comprising:

magnetizing means disposed in the vicinity of said moving body, for forming a point magnetic pole on the surface of the moving body to move therewith;

magnetic field detecting means, provided adjacent to said moving body, for detecting a magnetic field of the magnetic pole formed on said surface by said magnetizing means and outputting an voltage in accordance with a variation of said magnetic field caused by the movement of said moving body, both said magnetizing means and said magnetic field detection means being spaced from said moving body on a same straight line extending in a direction perpendicular to a direction of movement of said moving body; and output signal processing means for processing a signal output by said magnetic field detecting means and for determining a direction of movement of said moving body in accordance with a polarity of the output voltage of said magnetic field detecting means.

13. A device as in claim 1 wherein said magnetic field detecting means includes means for determining if the value of the voltage output from said magnetic field detecting means is substantially zero at a time when a magnetic pole has just been formed on a surface of said moving body by said magnetizing means, and thereafter, as the magnetic pole is displaced due to the movement of said moving body, the value of the voltage output from said magnetic field detecting means is gradually increased.

* * * * *